US009695982B2

(12) United States Patent
Rivet

(10) Patent No.: US 9,695,982 B2
(45) Date of Patent: Jul. 4, 2017

(54) METHOD AND SYSTEM FOR REDUCING THE RISK OF A MOVING MACHINE COLLIDING WITH PERSONNEL OR AN OBJECT

(71) Applicant: Darren Rivet, Edmonton (CA)

(72) Inventor: Darren Rivet, Edmonton (CA)

(*) Notice: Subject to any disclaimer, the term of this patent is extended or adjusted under 35 U.S.C. 154(b) by 0 days.

(21) Appl. No.: 14/206,509

(22) Filed: Mar. 12, 2014

(65) Prior Publication Data

US 2014/0309918 A1 Oct. 16, 2014

Related U.S. Application Data

(60) Provisional application No. 61/810,476, filed on Apr. 10, 2013.

(51) Int. Cl.
| | |
|---|---|
| *G08G 1/16* | (2006.01) |
| *F02D 11/10* | (2006.01) |
| *F02D 11/04* | (2006.01) |
| *F16P 3/00* | (2006.01) |
| *F16P 3/14* | (2006.01) |

(52) U.S. Cl.
CPC .................................. *F16P 3/147* (2013.01)

(58) Field of Classification Search
CPC . G01B 7/14; G06F 17/00; F02D 11/10; F02D 11/04; F02D 13/00; G08G 1/166; G08G 1/16
See application file for complete search history.

(56) References Cited

U.S. PATENT DOCUMENTS

| | | | |
|---|---|---|---|
| 4,995,363 A * | 2/1991 | Terazawa et al. | 123/399 |
| 5,198,800 A | 3/1993 | Tozawa et al. | |
| 5,572,969 A * | 11/1996 | Coughlin | 123/198 DC |
| 5,939,986 A | 8/1999 | Schiffbauer et al. | |
| 6,208,260 B1 | 3/2001 | West et al. | |
| 6,784,800 B2 | 8/2004 | Orzechowski | |
| 7,002,526 B1 | 2/2006 | Adams et al. | |
| 7,034,684 B2 | 4/2006 | Boman et al. | |
| 7,388,479 B2 | 6/2008 | Lee | |
| 8,115,650 B2 | 2/2012 | Dasilva et al. | |
| 2005/0285742 A1* | 12/2005 | Charych et al. | 340/572.1 |
| 2006/0025897 A1* | 2/2006 | Shostak et al. | 701/1 |
| 2008/0116274 A1* | 5/2008 | Aldridge | 235/440 |
| 2011/0151779 A1* | 6/2011 | Bongfeldt et al. | 455/39 |

(Continued)

*Primary Examiner* — Yonel Beaulieu
(74) *Attorney, Agent, or Firm* — Bennett Jones LLP

(57) ABSTRACT

A method and system for reducing the risk of a moving machine colliding with an object involves a receiving antenna attached to the machine receiving an RF signal transmitted by a transmitting antenna attached to the object and energized by a power source. A processor operatively connected to the receiving antenna carries out a computer-implemented process under the direction of a set of program instructions stored in the memory component to determine the machine-object distance based on the strength of the RF signal at the receiving antenna. If the machine-object distance is less than a specified minimum safe distance, then the processor takes a preventative action such as actuating a sensory alarm, actuating a means for slowing the machine, or actuating an acoustic location device to more accurately determine the machine-object distance. The processor may also take a preventative action based on a state variable encoded in the RF signal.

18 Claims, 7 Drawing Sheets

(56) References Cited

U.S. PATENT DOCUMENTS

| | | |
|---|---|---|
| 2011/0227748 A1 | 9/2011 | Schaible et al. |
| 2012/0025964 A1* | 2/2012 | Beggs .................. B60Q 1/2673 340/435 |
| 2012/0139708 A1* | 6/2012 | Paradiso et al. ............. 340/10.1 |
| 2013/0038320 A1* | 2/2013 | Frederick ................. 324/207.13 |
| 2013/0181838 A1* | 7/2013 | Luke et al. ................ 340/572.1 |

* cited by examiner

Algorithm for reducing risk of collision between machine and object

Step 601. Initialize in memory component (204):

first safe minimum distance, D1, delineating first unsafe zone around receiving antenna (201);

second safe minimum distance D2 < D1, delineating second unsafe zone around receiving antenna (201);

Step 602. Transmit RF signal from transmitting antenna (301) at power P, encoding information for state variable, S;

Step 603. Receive RF signal at receiving antenna (201);

Step 604. Process RF signal to determine field strength, E, at receiving antenna (201);

Step 605. Determine signal-based distance, $d_s$, between transmitting antenna (301) and receiving antenna (201) based on power, P, and field strength, E;

Step 606. If ($d_s \leq D1$), then:

actuate sensory alarm at operator interface (205);

actuate acoustic location device (208);

determine acoustic-based distance, $d_a$, using information from acoustic location device (208);

if $d_a \leq D2$, then actuate means for stopping machine (206, 207);

Step 607. If (S is TRUE), then actuate sensory alarm at operator interface (205), actuate means for stopping machine (206, 207) and/or record S in memory component (204);

Step 608. Return to step 602.

FIGURE 8

METHOD AND SYSTEM FOR REDUCING THE RISK OF A MOVING MACHINE COLLIDING WITH PERSONNEL OR AN OBJECT

CROSS REFERENCE TO RELATED APPLICATION

This application claims the priority benefit of U.S. Provisional Patent Application No. 61/810,476 filed on Apr. 10, 2013, entitled "Method and System for Reducing the Risk of a Machine Colliding with an Object", the entire contents of which are incorporated herein by reference.

FIELD OF THE INVENTION

The present invention relates to a method and a system for reducing the risk of a collision between a moving machine and an object, and in particular for reducing the risk of a collision between a moving vehicle and a person, or between a vehicle and another vehicle.

BACKGROUND OF THE INVENTION

In construction sites, collisions between machines and workers present a significant occupational hazard. Operators of machines such as trucks, forklifts, cranes and the like may have difficulty seeing these workers, especially when the vehicle is reversing or maneuvering, because of the size and configuration of these machines or their cargo loads. Meanwhile, the workers may not notice when the vehicles are set in motion if the workers are preoccupied with their tasks when working near the machine.

Several approaches have been developed to reduce this risk. One conventional approach is to equip the vehicle with a beeper system in which a beeper automatically activates when the reverse gear of the vehicle's transmission gear is selected. However, the sound of the beeper may be drowned out by ambient noise or attenuated by hearing protection equipment worn by workers. Further, the sound of the beeper may become so prevalent in a busy construction site that workers may ignore the sound. Finally, the system ultimately relies on the worker's ability to move out of vehicle's path, which may not be possible if the worker is confined between the vehicle and another obstacle.

U.S. Pat. No. 7,388,479 discloses a back-up alarm system comprising an optical sensor, a circuit control and a speaker. The optical sensor is used to detect the presence of a worker when the vehicle is backing up. If the optical sensor does not detect the presence of a worker, the circuit control causes the speaker to generate a lower volume audible alarm. Conversely, if the optical sensor detects the presence of a worker, the circuit control causes the speaker to generate a higher volume audible alarm. Although this system is more selective as to when it produces the audible alarm than the conventional beeper system, it continues to suffer from many of the same disadvantages as the conventional beeper system.

U.S. Pat. No. 8,115,650 and US patent application Ser. No. 2011/0227748 disclose warning systems comprising a transmitter and a sensor onboard the vehicle, and passive RFID tags embedded in clothing worn by a worker. In general, the transmitter generates an interrogation signal within a detection zone. Any passive RFID tags within the detection zone emit a response signal. If the sensor detects the response signal, a processor actuates a sensory alarm or a means for stopping the vehicle. U.S. Pat. No. 8,115,650 also discloses that the system may include an ultrasound sensor onboard the vehicle that is activated in response to the detection of an RFID tag by the sensor to determine the distance between the vehicle and the worker. Depending on whether the worker is moving towards or away from the vehicle, the system selectively either allows the vehicle to continue moving or causes the vehicle to shut down. One potential disadvantage of using passive RFID tags is that they radiate relatively weak signals. This practically limits the size of the detection zone to a relatively short distance of about five meters or less, which is insufficient for rapidly moving vehicles. The lack of signal strength also makes it difficult to accurately determine the distance between the vehicle and the worker from the signal strength. Another disadvantage of systems using passive RFID tags is the need for reliable two-way signal transmission and reception between the vehicle and the worker. The system will fail if either one of the interrogation signal or the response signal is not both properly transmitted and received.

Accordingly, there is a need in the art for a method and system for reducing the risk of a machine colliding with an object, and in particular a person. The method and system should preferably be simple, economical, reliable and adaptable to warn vehicle operators of the presence of workers at significant distances from the machine.

SUMMARY OF THE INVENTION

In one aspect, the present invention provides a method for reducing the risk of a machine colliding with an object which may be equipment or a person, the method comprising the steps of:

(a) generating an RF signal and transmitting it by a transmitting antenna attached to or associated with the object and receiving the RF signal with a receiving antenna attached to the machine;

(b) using a processor to automatically perform a computer-implemented process as directed by a set of program instructions stored in a memory component, the computer-implemented process comprising the steps of:

(i) determining a RF signal-based machine-object distance between the machine and the object based on at least the strength of the RF signal at the receiving antenna; and (ii) conditional upon at least one minimum safe distance stored in the memory component exceeding the determined signal-based machine-object distance, taking at least one signal-based preventative action comprising one of actuating an alarm or actuating a means for slowing, or stopping the machine, or both.

In one embodiment of the method, the transmitting antenna is energized by a battery to emit the RF signal.

In one embodiment of the method, the transmitting antenna is retained by a garment worn by a person who is the object.

In one embodiment of the method, the object is another machine.

In one embodiment of the method, the means for slowing or stopping the machine comprises a valve to control the flow of air to an internal combustion engine of the machine, a switch for interrupting electric current to an electrical ignition system of the machine, or a mechanical braking system.

In one embodiment of the method, the at least one minimum safe distance comprises a plurality of different minimum safe distances, and the signal-based preventative action to be taken is conditional upon which ones of the minimum safe distances exceed the determined signal-based machine-object database.

In one embodiment of the method, the computer-implemented process further comprises determining a direction between the object and the machine. In this embodiment, the taking of the signal-based preventative action may be further conditional upon the determined direction.

In one embodiment of the method, the at least one signal-based preventative action comprises in the further alternative: determining an acoustic-based machine-object distance using an acoustic location device attached to the machine and operatively connected to the processor; and conditional upon the at least one minimum safe distance exceeding the determined acoustic-based machine-object distance, taking at least one acoustic-based preventative action comprising one or a combination of: actuating the sensory alarm; or actuating the means for slowing or stopping the machine.

In one embodiment of the method, the RF signal encodes for a state variable, and the computer-implemented process further comprises the step of, conditional upon the state variable satisfying a test value stored by the memory component, taking at least one state-based preventative action comprising one or a combination of: actuating the sensory alarm; or actuating the means for slowing or stopping the machine. In this embodiment, the state variable may be indicative of one or a combination of: an identifier associated with the object; an environmental state; a man down state; or the remaining charge of a battery that energizes the transmitting antenna.

In another aspect, the present invention provides a system for reducing the risk of a machine colliding with an object having an attached or associated transmitting antenna for transmitting an RF signal, the system comprising:
 (a) a receiving antenna for receiving the RF signal, wherein the receiving antenna is attached to the machine;
 (b) a receiver operatively connected to the receiving antenna;
 (c) an alarm;
 (d) a means for slowing or stopping the machine; and
 (e) a processor operatively connected to the receiver, the means for slowing or stopping the machine, the alarm and a memory component storing a set of program instructions directing the processor to perform a computer-implemented process comprising the steps of:
  (i) determining a signal-based machine-object distance between the machine and the object based on at least the strength of the RF signal at the receiving antenna; and
  (ii) conditionally upon at least one minimum safe distance stored in the memory component exceeding the determined signal-based machine-object distance, taking at least one signal-based preventative action comprising one or a combination of: actuating the sensory alarm; or actuating the means for slowing or stopping the machine.

In one embodiment of the system, the means for slowing or stopping the machine comprises a valve to control the flow of air to an internal combustion engine of the machine.

In one embodiment of the system, the means for slowing or stopping the machine comprises a switch for interrupting electric current to an electrical ignition system of the machine.

In one embodiment of the system, the means for slowing or stopping the machine comprises a mechanical braking system.

In one embodiment of the system, the at least one minimum safe distance comprises a plurality of different minimum safe distances, and the preventative action to be taken is conditional upon which ones of the minimum safe distances exceed the determined signal-based machine-object database.

In one embodiment of the system, the system further comprises an acoustic location device attached to the machine and operatively connected to the processor, and the computer-implemented process further comprises the steps of: determining an acoustic-based machine-object distance using the acoustic location device; and conditionally upon the at least one minimum safe distance exceeding the determined acoustic-based machine-object distance, taking at least one acoustic-based preventative action comprising one or a combination of: actuating the sensory alarm; or actuating the means for slowing or stopping the machine.

In one embodiment of the system, the computer-implemented process further comprises the step of: conditional upon a state variable encoded by the RF signal satisfying a test value stored by the memory component, taking at least one state-based preventative action comprising one or a combination of: actuating the sensory alarm; or actuating the means for slowing or stopping the machine.

BRIEF DESCRIPTION OF THE DRAWINGS

In the drawings, like elements are assigned like reference numerals. The drawings are not necessarily to scale, with the emphasis instead placed upon the principles of the present invention. To the extent that the drawings are of specific embodiments or a particular use of the invention, they are intended to be illustrative only, and not limiting of the claimed invention. The drawings are briefly described as follows.

FIG. 8 provides an algorithm for one embodiment of the method of the present invention for reducing the risk of a collision between a moving machine and an object.

DETAILED DESCRIPTION OF PREFERRED EMBODIMENTS

The present invention relates to a method and system for reducing the risk of a collision between a moving machine and a fixed or mobile object, such as a worker. When describing the invention, any term or expression not expressly defined herein shall have its commonly accepted definition understood by those skilled in the art. To the extent that the following description is of a specific embodiment or a particular use of the invention, it is intended to be illustrative only, and not limiting of the claimed invention.

As used herein, the term "machine" refers to a mechanical device that either moves as a whole or that has a moving part. Non-limiting examples of machines include a vehicle such as a truck, or the moving part of a crane or an excavator.

As used herein, the term "object" refers to anything, mobile or immobile, with which the machine may collide. Non-limiting examples of objects include persons, other machines, or other parts of a machine having a moving part. Such objects may also include stationary hazards such as overhead, surface or underground power lines, or other utility lines, pipes or conduits.

Figure 1:
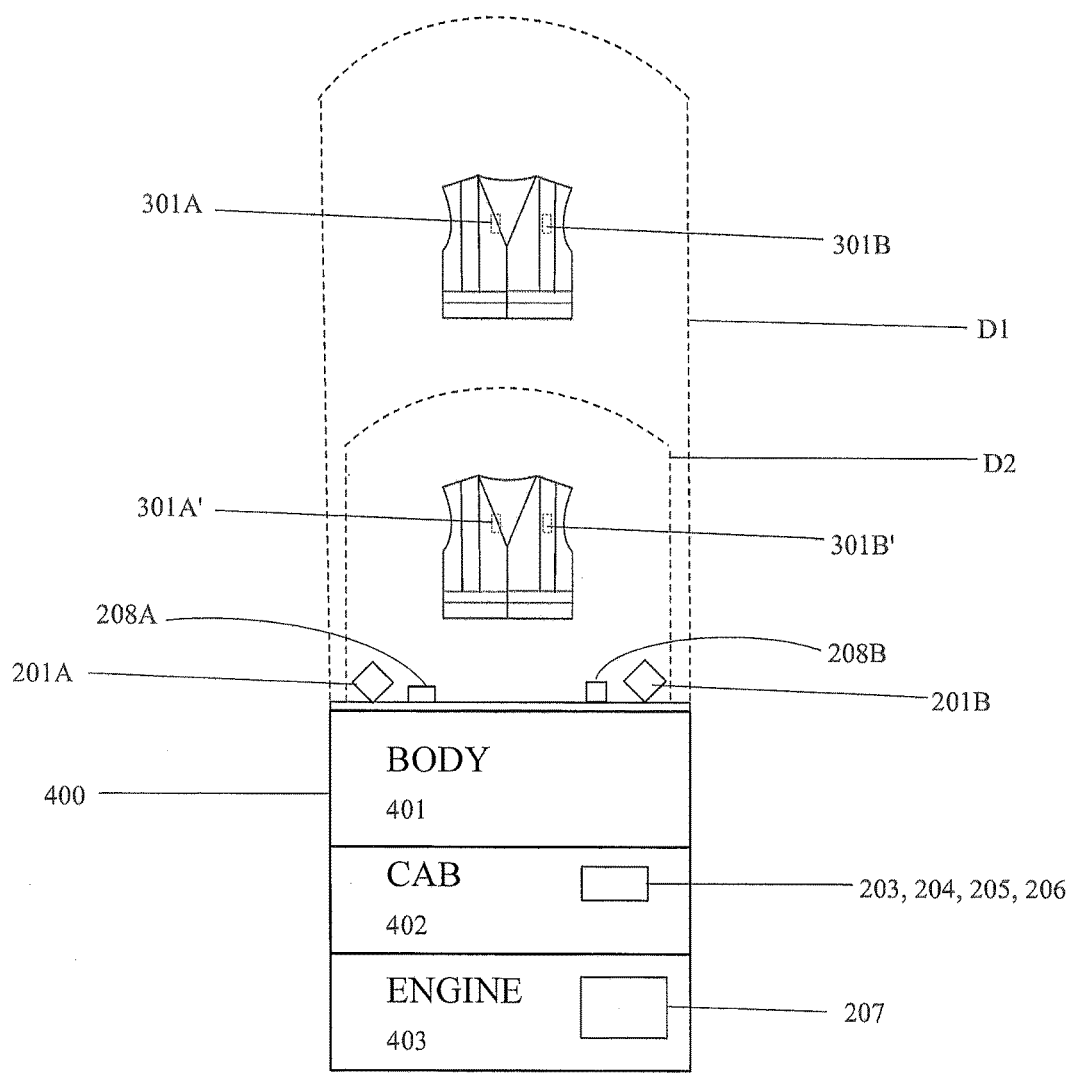
FIG. 1 is a diagrammatic depiction of one embodiment of the present invention used to reduce the risk of a collision between a moving truck and a person.
Figure 2:
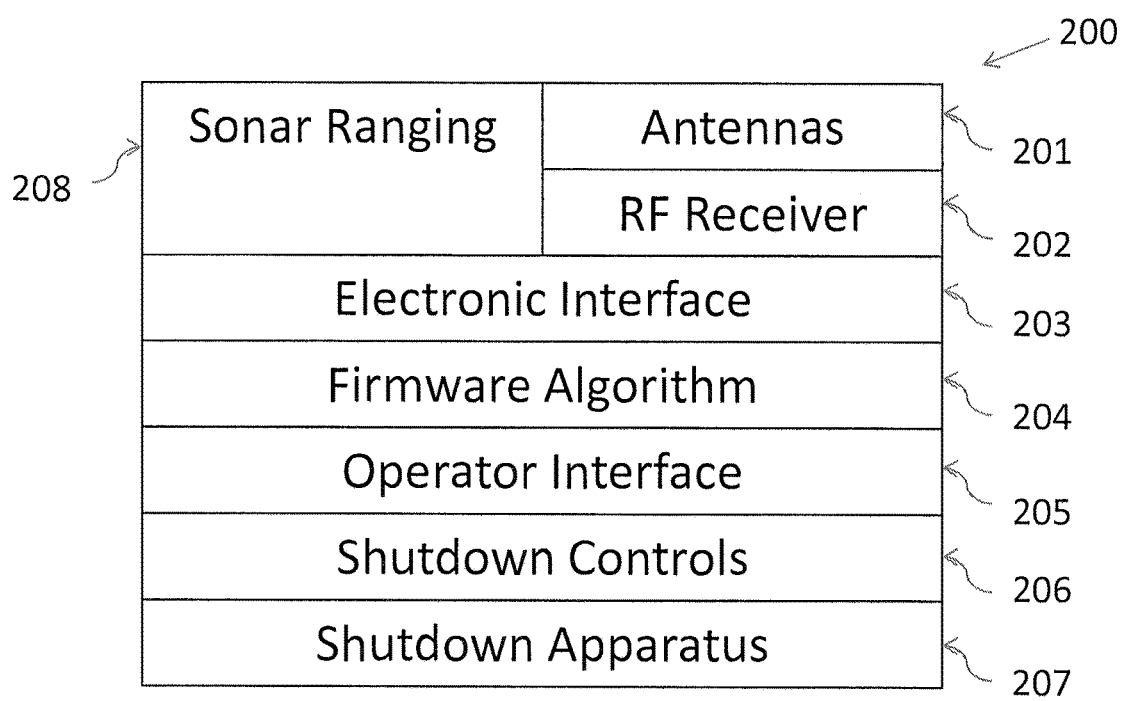
FIG. 2 is a schematic depiction of a machine module in one embodiment of the present invention.
Figure 3:
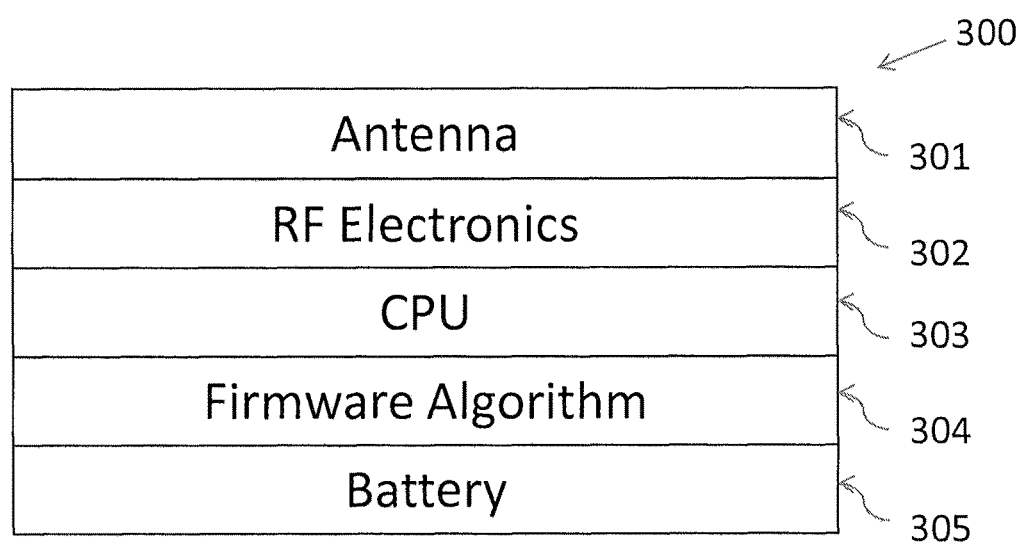
FIG. 3 is a schematic depiction of an object module in one embodiment of the present invention.
Figure 4:
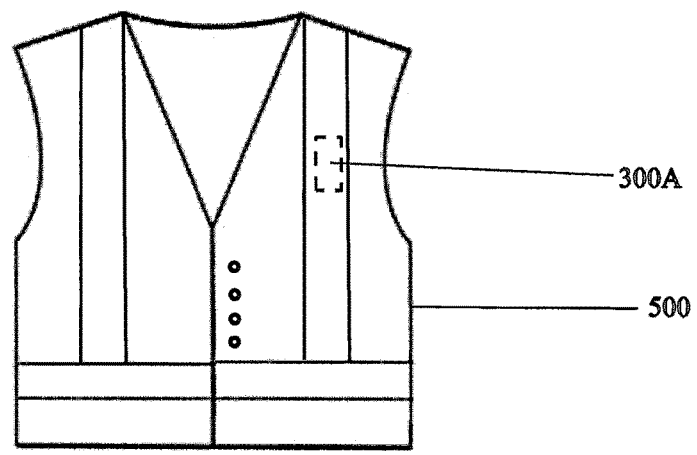
FIG. 4 is a front view of a vest carrying the object module in one embodiment of the present invention.
Figure 5:
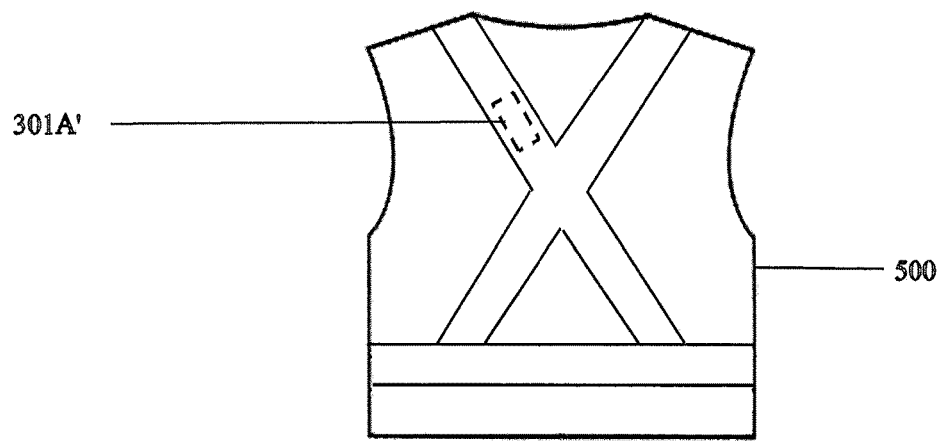
FIG. 5 is a rear view of a vest carrying the object module in one embodiment of the present invention.

FIG. 1 provides a diagrammatic depiction of one embodiment of the system (100) of the present invention used to reduce the risk of a collision between a truck (400) and a worker. The system (100) may be implemented by a machine module (200), as shown in FIG. 2, and an object module (300) as shown in FIG. 3. In one embodiment, the object module (300) may be integrated into a clothing item worn by a person, such as a safety vest (500), as shown in FIGS. 4 and 5. Alternatively, the object module (300) may be affixed to any stationary or mobile object.

FIG. 2 shows the components of the machine module (200) in one embodiment of the present invention. It will be understood that the components of the machine module (200) are operatively connected to each other, and may be physically integrated or separated from each other. It will be further understood that the some of the components may be operatively connected by wired connections, or wireless connection. It will be further understood that any of the single components of the machine module (200) may in practice comprise a plurality of the same component.

The machine module (200) comprises a receiving antenna (201), a receiver (202), a processor (203), and a memory component (204). The machine module (200) further comprises at least either one of an operator interface (205) or a means for slowing or stopping the machine (206, 207). In a preferred embodiment, the machine module (200) comprises both an operator interface (205) and a control interface for slowing or stopping the machine (206) which is operatively connected to a switch or other device which slows or stops the machine (207). In embodiments, the machine module (200) may also include an acoustic location device (208).

The receiving antenna (201) intercepts RF signals that are emitted by a transmitting antenna (301) attached to the object module (300). In one embodiment, the receiving antenna (201) may be a directional antenna to aid in the determination of the direction from which an RF signal is received.

The receiver (202) is operatively connected to the receiving antenna (201) to receive signals from the receiving antenna (201) and extract desired information from the input signal through signal processing. The receiver may be implemented by an electronic circuit or other electronic device. The art of receivers and signal processing is well known and is not considered to be part of the present invention.

The processor (203) is operatively connected to the receiver (202) and the memory component (204). The processor (203) may be any computer hardware device that is capable of executing a set of program instructions that is either permanently or temporarily stored by the memory component (204) to perform a computer-implemented process as will be explained below. The set of program instructions for performing a particular process may be characterized as a program, software program, software, engine, module, component, mechanism, or tool. The program instructions may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language or combinations of languages may be used in accordance with the various embodiments of the invention. As an example, the processor (203) and the memory component (204) may be implemented using a microprocessor and data storage devices that are typical of a general purpose computer.

The operator interface (205) is operatively connected to the processor (203). The operator interface may be any device that is capable of outputting a sensory alarm in one or a combination of audio, visual, or tactile format to alert the operator of the machine. In one embodiment, for example, the operator interface (205) may be implemented by a combination of a display monitor and speaker system. In embodiments, the operator interface (205) may also be used to receive input from the operator of the machine to control or configure the system (100), as will be explained below.

The means for slowing or stopping the machine (206, 207) is operatively connected to the processor (203) and to the machine (400). The means for slowing or stopping the machine (206, 207) may comprise any device or mechanism suited to slow or stop the motion of machine. The nature of the means (206, 207) will vary with the nature of the machine to which the system is applied. In one embodiment, for example, where the machine is a vehicle with a diesel engine, the means for slowing or stopping the machine (206, 207) may comprise an electronically controlled shut down valve that interrupts or controls the supply of air to the engine. In another example, where the machine has an internal combustion engine with an electrical ignition system, the means for slowing or stopping the machine (206, 207) may comprise a switch that interrupts the supply of electrical current to a component of the electrical ignition system such as an ignition coil, a capacitor, a spark plug, or a glow plug. In another example, where the machine is the moving part of a mechanical device that is driven by an electrically powered motor, the means for slowing or stopping the machine (206, 207) may comprise a switch that interrupts the supply of electrical power to the motor. In another example, where the machine has a mechanical braking system, the means for slowing or stopping the machine (206, 207) may comprise a device that actuates the braking system.

In one embodiment, the system (100) comprises an acoustic location device (208), operatively connected to the processor (203). In one embodiment, the acoustic location device (208) comprises an acoustic emitter, an acoustic detector, and a clock. The acoustic emitter may comprise any device suited to emitting acoustic pulses such as an electrically powered transducer or speaker. The acoustic detector may comprise any device suited to receive acoustic pulses reflected from an object. A non-limiting example of an acoustic detector is a piezoelectric microphone. The clock may comprise any device configured to measure the time elapsed between the emission of an acoustic pulse by the acoustic emitter and the reception of a reflected acoustic pulse by the acoustic detector. Acoustic location devices may operate at sonic, ultrasonic or infrasonic frequencies. The art of acoustic location devices (208) is well known and not considered to be part of the present invention.

FIG. 3 shows the components of the object module (300). It will be understood that the components of the object module (300) are operatively connected to each other, and may be physically integrated or separated from each other. It will be further understood that some of the components of the object module (300) may be operatively connected by wired connections, or wireless connection. It will be further understood that any of the single components shown may in practice comprise a plurality of the same component.

The object module (300) comprises a transmitting antenna (301), and a power source (305). In embodiments, the object module (300) may also include an electronic circuit (302) including RF electronics, a processor (303) and a memory component (304). In one embodiment, the object module (300) is sufficiently portable to be carried by a person. In one embodiment, the object module (300) may be implemented in an active RFID tag.

The transmitting antenna (301) radiates RF signals. In one embodiment, the transmitting antenna (301) is omni-directional so that the electric field strength of the radiated RF signal is approximately uniform in all directions.

The power source (305) is operatively connected to the transmitting antenna (301) to energize the transmitting antenna (301) to radiate RF signals. For example, the power source (305) may comprise an electrochemical battery, such as a rechargeable lithium-ion battery. The power source (305) also supplies electrical energy to the processor (303) and to the memory component (304) where such components are present.

The processor (303) is operatively connected to the transmitting antenna (301), the power source (305) and the memory component (304). In one embodiment, the processor (303) and the memory component (304) may be implemented using a microprocessor and a memory component that are typical of a RFID tag.

The use and operation of the system (100) in one embodiment are now described by way of an example in which the system (100) is used to reduce the risk of a collision between a truck (the machine) when backing up and a person (the object) working behind the truck, as shown diagrammatically in FIG. 1, and in accordance with the algorithm shown in FIG. 8.

Prior to commencing the algorithm, the system (100) is prepared by equipping the truck (400) with the components of the machine module (200). In the embodiment shown in FIG. 1, two directional receiving antennas (201A, 201B) and two acoustic location devices (208A, 208B) are attached to the external body (401) of the truck (400). The two directional receiving antennas (201A, 201B) and the two acoustic location devices (208A, 208B) face in the rearward direction of the truck (400) and are angled toward each other so as to better detect objects behind the truck (400) and to aid in determining the direction of an object relative to the truck (200). The directional receiving antennas (201A, 201B) and acoustic location devices (208A, 208B) may be positioned and oriented to detect objects in other directions, and additional receiving antennas (201) and acoustic location devices (208) may be provided to detect objects in other directions. The processor (203), memory component (204), operator interface (205) and electronic circuit (206) of the means for slowing or stopping the machine are operatively connected with each other and installed within the internal cab (402) of the truck (400) or housed in some other enclosure to protect them from the elements. The means for slowing or stopping the machine (207) in the form of a shutdown valve that is connected to the engine (403) of the truck (400) for interrupting air flow to the engine and a switch that interrupts the supply of electricity to an electronic ignition system of the vehicle are also operatively connected to the electronic circuit (206).

In step (601), the machine module (200) is initialized by inputting and storing in the memory a first safe minimum distance, D1, and a second safe minimum distance, D2 between the receiving antennas (201) and the object, which define and a first unsafe zone and a second unsafe zone, respectively, around the machine. Referring to FIG. 1, in this embodiment, the first safe minimum distance, D1, is greater than the second safe minimum distance, D2. These values of D1 and D2 may either be hardwired, or customized by the operator of the machine using the input functions of the operator interface (205), or programmed using a laptop computer or other computing device. Next, the object, which in this case is a person, is equipped with an object module (300). In the embodiment shown in FIGS. 1, 4, and 5, a first object module (300A) is sewn into the front side of the safety vest (500) worn by a person, and a second object module (300B) is sewn into the back side of the safety vest (500). In this manner, the strength of the RF signal radiated by the transmitting antenna (301A) of the first object module (300A) towards the receiving antennas (201A, 201B) when the person faces towards the truck (400) will be approximately the same as the strength of the RF signal radiated by the transmitting antenna (301B) of the second object module (300B) when the person faces away from the truck (400). It will be appreciated that the object module (300) may be integrated in other manners, and into other clothing items such as a hard hat or a pant pocket. The person may be equipped with a number of transmitting antennas (301) by either equipping the person with a number of object modules (300) each having a single transmitting antenna (301) and other components (302 to 305), or by equipping the person with a single object module (300) having a number of transmitting antennas (301) that share other components (302 to 305). A plurality of persons may be similarly equipped with their own object module (300). Once the system (100) has been prepared, the power source (305) energizes the processor (303) and the transmitting antenna (301).

In step (602), in the object module (300), the processor (303) executes the program instructions stored by the memory component (304) to cause the electronic circuit (302) to feed an electronic signal to the transmitting antenna (301). The transmitting antenna (301) radiates the input electronic signal as an RF signal at a known power, P. The processor (303) may be instructed by the program set of instruction stored in the memory component (304) to generate signals encoding for one or more state variables, S. By way of non-limiting examples, the state variable, S, may be the power of the transmitted RF signal, an alpha-numerical identifier associated with the person as stored in the memory component (304), an indicator of an environmental state such as radiation exposure levels of the person as detected by a radiation exposure badge operatively connected to the processor (303), or an indicator of a "man-down" state if the person presses an emergency button operatively connected to the processor (303), or the estimated remaining battery charge, capacity, or voltage of a battery power source (305) that energizes the transmitting antenna (301A, 301B).

It will be understood that the RF signal transmission by the transmitting antenna (301A, 301B) is powered by the power source (305), making this an active system rather than a passive system. This allows the system (100) to transmit RF signals over any desired practical range by providing a suitably powerful power source (305). Thus, the operator of the machine (100) can be alerted to the presence of a person further away from the machine, thus permitting greater time to take evasive action. Unlike a system that uses passive RFID tags, the system (100) does not require an interrogation signal to be sent from the machine to the object. This reduces the number of RF signals that need to be transmitted and received, which makes for a more reliable system (100).

In step (603), the RF signal is intercepted by the receiving antennas (201A, 201B), provided that the receiving antennas are within range. The receiving antennas (201A, 201B) communicate the RF signal as an input signal to the receiver (202).

The processor (203) extracts desired information from the input signal including but not limited to the strength of the RF signal at the receiving antennas (201A, 201B). The processor (203) then executes the set of program instructions stored in the memory component (204). In step (605), the processor (203) determines a signal-based distance, $d_s$, between the truck (400) and the person (referred to herein as the "machine-object distance") based on the field strength of the received RF signal. The machine-object distance may be estimated by mathematical relationships to the strength of the received RF signal, and/or other parameters related to the antennas physical characteristics, as are known in the art. These relationships may be empirically determined or otherwise calculated.

In step (606), the processor (203) compares the signal-based machine-object distance to a rules database defining at least one unsafe zone and at least one related action. An unsafe zone may be defined by a minimum safe distance between the machine and the object. If the processor (203) determines that the machine-object distance is greater that the first minimum safe distance, D1, then the processor (203) takes no further action.

Alternatively, if the processor (203) determines that the signal-based machine-object distance is less than the first minimum safe distance (i.e., the person is within the first unsafe zone (D1)), then the processor (203) takes a signal-based preventative action corresponding to the first unsafe zone (D1). For example, the processor (203) may cause the operator interface (205) to display a sensory alarm such as an audible sound, a visual message, a tactile alarm, or a combination of them, alerting the operator of the truck (400) to the presence of the person. For example, the visual message may be a flashing light, or warning graphic. For example, the audible sound may be an intermittent series of beeps that increase in volume, pitch, and time-frequency as the machine-object distance decreases, thereby warning the truck operator with greater urgency as a collision between the truck (400) and the object becomes more imminent. For example, the tactile alarm may be a vibrating alarm attached to the seat or manual controls of the truck (400). In addition, or in the alternative, the processor (203) may actuate a sensory alarm such as an audible sound, a visual message or both, alerting a sentient object like a person to the presence of the truck (400). For example, the processor (203) may be operatively connected to a flashing light and siren mounted externally to the cab that is visible and audible to the persons inside or near boundary of the first unsafe zone (D1).

In one embodiment, the signal-based preventative action may be activating the acoustic location device (208) to emit an acoustic pulse towards the person, detecting the acoustic pulse reflected by the person and measuring the time interval between these two events. The processor (203) may then determine an acoustic-based machine-object distance, $d_a$, based on relationships between the time interval, and the assumed speed of the acoustic pulse. This allows the machine-object distance to be determined with greater accuracy than based on the strength of the RF signal alone.

If the acoustic-based machine-object distance, $d_a$, is within the second unsafe zone (D2), then the processor (203) may take a pre-determined preventative action. The acoustic-based preventative action may be actuating the means for slowing or stopping the machine (206, 207), such as the valve that shuts down the air supply to the engine to prevent the truck (400) from being driven towards the person under the motivation of the engine (403), or the switch that interrupts the supply of electricity to the electronic ignition system for the engine to prevent the truck engine from being restarted so long as the machine-object distance is still within the second unsafe zone.

In step (607), the processor determines whether the state variable, S, encoded by the RF signal satisfies a test value (i.e., is "true"). The test value may be hardwired or input into the memory component (204) using the operator interface (205). For example, the test value may define a threshold value for one or more state variables. If the state variable satisfies the test value, then the processor (203) takes a corresponding state-based preventative action. The state-based preventative action may be actuating a sensory alarm through the operator interface (205), actuating the means for slowing or stopping the machine (206, 207), or storing the state variable in the memory component (204) so that it can be logged for a follow-up action. For example, if the state variable is indicative of an identifier associated with a person and that person is not permitted to be within a certain minimum safe distance of the machine, then the processor (203) may actuate a sensory alarm. In another example, if the state variable is indicative of the remaining charge of a battery in the object module (300) and if that remaining charge is below a minimum threshold value, then the processor (203) may store that information in the memory component (204), actuate a sensory alarm, or actuate the means for slowing or stopping the machine (206, 207). In this manner, the system (100) guards itself against potential failure due to a non-functioning battery (305) that fails to sufficiently energize the transmitting antenna (301) to emit the RF signal.

In step (608), the machine module (300) is readied to process further transmitted RF signals received by the receiving antenna (201). Steps (602) through (608) are repeated in respect to additional RF signals transmitted by the same transmitting antenna (301) or transmitting antennas (301) of other object modules (300).

It will be appreciated that the algorithm as described above may be customized to suit a particular application. For example, the number of minimum safe distances, D, may be changed to define a desired number of unsafe zones. The signal-based preventative action, the acoustic-based preventative action, and the state-based preventative action may be selected from amongst actuating the sensory alarm, actuating the means for slowing or stopping the machine or both, as desired for particular unsafe zones, or states. The signal-based preventative action, the acoustic-based preventative action, and the state-based preventative action may be conditional and prioritized based on the combination of unsafe zones in which an object module is detected, and the state variable encoded in the RF signal transmitted by the object module. In addition, the taking of the signal-based preventative action or the preventative acoustic-based preventative action may be further conditional upon the direction between the machine and the object as determined by the use of directional receiving antennas or directional acoustic location devices. For example, the preventative action may be selectively taken if the object is positioned in a forward direction of the movement of the machine, but not if the object is in a backward direction of the movement of the machine.

Figure 6:
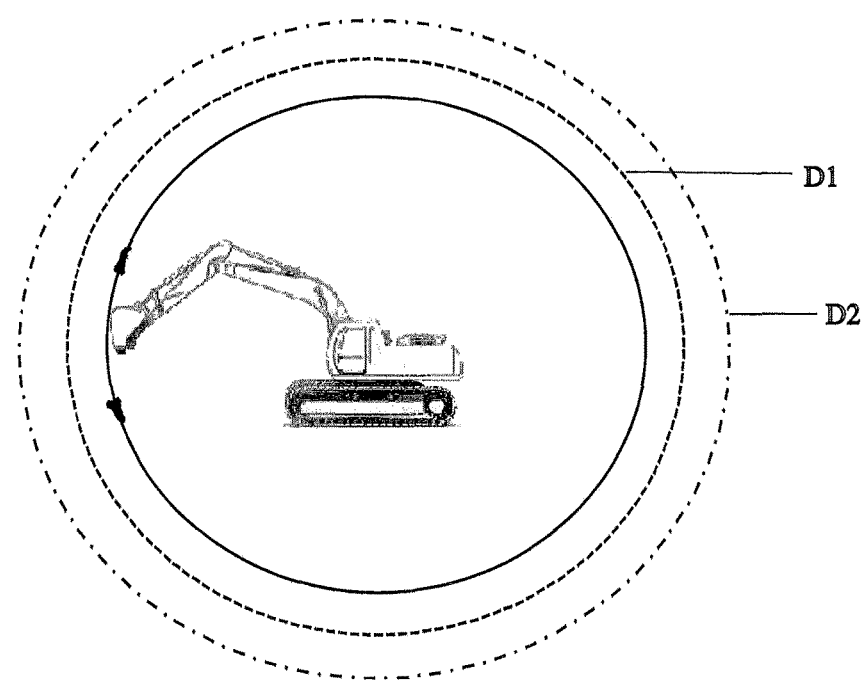
FIG. 6 is a diagrammatic depiction of the top view of one embodiment of the present invention used to reduce the risk of a collision between the rotating arm and shovel of a backhoe excavator and a worker.

In another use of the system (100), the system (100) may be used to define a "keepout zone" around a relatively stationary machine having a moving component around which persons may be working. Examples of such machines include a crane or a backhoe excavator. For example, as shown in FIG. 6, the backhoe excavator (700) has a pivoting cab and an attached arm and shovel. Since the pivot centre of the excavator coincides with the cab, the position of the cab remains relatively unchanged while the arm and shovel may rotate in a circular path. The machine module (200) is installed in the cab of the excavator while the object module (300) is worn by the person. The memory component (204) may be programmed so that the first and second safe distances are greater than the distance between the cab and the shovel to define first and second unsafe zones (D1, D2) that encircle the circular path of the shovel, with the first unsafe zone being smaller than the second unsafe zone. The means for slowing or stopping the machine (206, 207) may be a switch that interrupts the supply of power to a motor that drives the rotation of the arm. If the system (100) detects the presence of the object module (300) (such as one integrated within the vest worn by a worker) within the first unsafe zone (D1), then the system (100) may selectively take an action such as sounding an audible, visual or tactile alarm to alert the operator of the backhoe excavator or the person wearing the object module (300), or both. If the system (100) detects the presence of the object module (300) within the closer second unsafe zone (D2), then the system (100) may selectively take an action such as interrupting the power supply to the motor that drives the rotation of the arm.

In another use of the system, not shown, the object module (300) may be attached to stationary objects which may be hazardous. For example, the object module (300) may be attached to an overhead power line which crosses a worksite, or the object module (300) may be attached to a fire hydrant, which should not be hit for obvious reasons.

Figure 7:
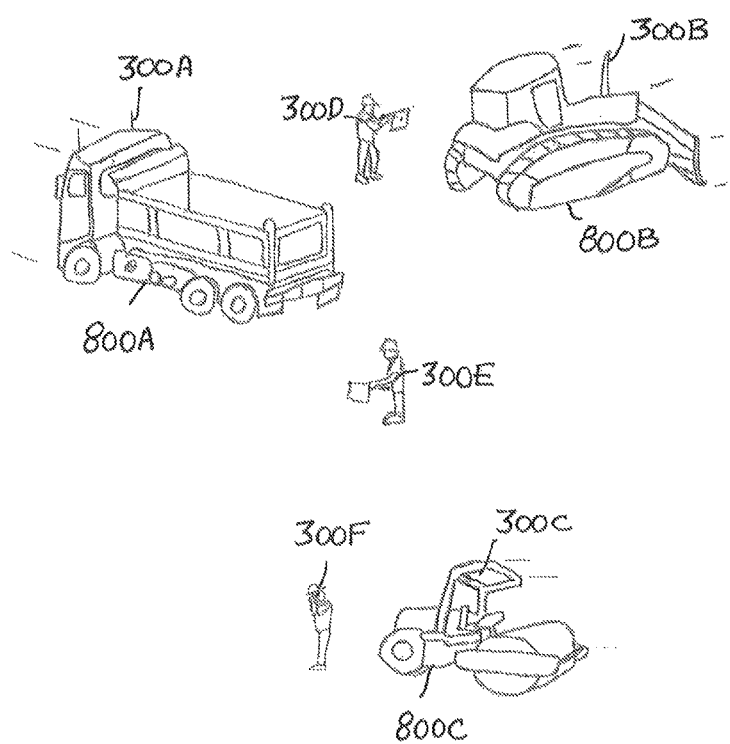
FIG. 7 is a diagrammatic depiction of one embodiment of the present invention used to reduce the risk of a collision between several vehicles and several workers at a worksite.

In another use of the system (100), as shown in FIG. 7, one of several object modules (300A through 300F) may each be attached to one of several workers or one of several vehicles (800A, 800B, 800C) at a worksite. In this manner, the system (100) may be used to reduce the risk of collisions between the two of the vehicles (800A, 800B, 800C), as well as between a vehicle (800A, 800B, 800C) and a worker.

As a corollary to avoiding a collision between a moving machine and an object, the system (100) may also be adapted to assist the operator of the machine in placing the machine accurately in a desired position relative to the object. For example, the machine module (200) may be attached to arm of a crane carrying a cargo load and the object module (300) may be attached to a structure. The rules database may be adapted to trigger a sensory alarm, or even stop the movement of the arm, when the arm of the crane is properly positioned over the structure to place the cargo load in a desired location. Or, the system (100) may be used to assist the operator of a truck (400) in reverse parking the truck in close proximity to a structure without colliding with the structure.

The system (100) may also be adapted to serve as a general site tracking device for a plurality of objects. For example, this may be achieved by providing one or more directional receiving antenna (201), equipping a plurality of objects with their own object modules (300) and adapting the rules database to cause the operator interface (205) to display the position and identity of any detected objects according to their machine-object distance as determined by the strengths of the RF signals transmitted from the object modules (300). In one embodiment, for example, several directional receiving antennas (201) may be distributed in a series of rows and columns throughout the site being monitored to divide the site into numerous sectors that describe the location of the objects.

As will be apparent to those skilled in the art, various modifications, adaptations and variations of the foregoing specific disclosure can be made without departing from the scope of the invention as defined by the claims herein.

What is claimed is:

1. A method for reducing the risk of a moving machine colliding with an object, the method comprising the steps of:
   (a) generating a radio frequency (RF) signal and transmitting it by a transmitting antenna attached to or associated with the object, and receiving the RF signal with a receiving antenna attached to the machine;
   (b) using a processor to automatically perform a computer-implemented process as directed by a set of program instructions stored in a memory component, the computer-implemented process comprising the steps of:
      (i) determining a RF signal-based machine-object distance between the machine and the object based on at least the strength of the RF signal at the receiving antenna; and
      (ii) conditional upon at least one minimum safe distance from a plurality of different minimum safe distances stored in the memory component exceeding the determined signal-based machine-object distance, taking at least one signal-based preventative action corresponding to the at least one minimum safe distance which exceeds the machine-object distance wherein the at least one signal-based preventative action comprises determining an acoustic-based machine-object distance using an acoustic location device attached to the machine and operatively connected to the processor; and conditional upon the at least one minimum safe distance exceeding the determined acoustic-based machine-object distance, taking at least one acoustic-based preventative action comprising one or a combination of: actuating a sensory alarm; or actuating a means for slowing or stopping the machine.

2. The method of claim 1 wherein the transmitting antenna is energized by a battery to emit the RF signal.

3. The method of claim 1 wherein the transmitting antenna is retained by a garment worn by a person who is the object.

4. The method of claim 1 wherein the object is another machine.

5. The method of claim 1 wherein the means for slowing or stopping the machine comprises a valve to control the flow of air to an internal combustion engine of the machine.

6. The method of claim 1 wherein the means for slowing or stopping the machine comprises a switch for interrupting electric current to an electrical ignition system of the machine.

7. The method of claim 1 wherein the means for slowing or stopping the machine comprises a mechanical braking system.

8. The method of claim 1 wherein the preventative action comprises one of actuating an alarm, or actuating a means for slowing or stopping the machine, or both.

9. The method of claim 1 wherein the computer-implemented process further comprises determining a direction between the object and the machine.

10. The method of claim 9 wherein taking of the signal-based preventative action is further conditional upon the determined direction.

11. The method of claim 1 wherein the RF signal further encodes for a state variable and
conditional upon the state variable satisfying a test value stored by the memory component, taking at least one state-based preventative action.

12. The method of claim 11 wherein the state variable is indicative of one or a combination of: an identifier associated with the object; an environmental state; a man down state; or the remaining charge of a battery that energizes the transmitting antenna.

13. A system for reducing the risk of a moving machine colliding with an object having an attached or associated transmitting antenna for transmitting a radio frequency (RF) signal, the system comprising:
  (a) a receiving antenna for receiving the RF signal, wherein the receiving antenna is attached to the machine;
  (b) a receiver operatively connected to the receiving antenna;
  (c) an alarm;
  (d) a means for slowing or stopping the machine; and
  (e) a processor operatively connected to the receiver, the means for slowing or stopping the machine, the alarm and a memory component storing a set of program instructions directing the processor to perform a computer-implemented process comprising the steps of:
    (i) determining a signal-based machine-object distance between the machine and the object based on at least the strength of the RF signal at the receiving antenna; and
    (ii) conditionally upon at least one minimum safe distance from a plurality of different minimum safe distances stored in the memory component exceeding the determined signal-based machine-object distance, taking at least one signal-based preventative action corresponding to the at least one minimum safe distance which exceeds the machine-object distance wherein the at least one signal-based preventative action comprises determining an acoustic-based machine-object distance using an acoustic location device attached to the machine and operatively connected to the processor; and conditional upon the at least one minimum safe distance exceeding the determined acoustic-based machine-object distance, taking at least one acoustic-based preventative action comprising one or a combination of: actuating a sensory alarm; or actuating a means for slowing or stopping the machine.

14. The system of claim 13 wherein the means for slowing or stopping the machine comprises a valve to control the flow of air to an internal combustion engine of the machine.

15. The system of claim 13 wherein the means for slowing or stopping the machine comprises a switch for interrupting electric current to an electrical ignition system of the machine.

16. The system of claim 13 wherein the means for slowing or stopping the machine comprises a mechanical braking system.

17. The system of claim 13 wherein the signal-based preventative action comprises one of actuating an alarm, actuating a means for slowing or stopping the machine, or both.

18. The system of claim 13 wherein the RF signal encodes a state variable and conditional upon a state variable encoded by the RF signal satisfying a test value stored by the memory component, taking at least one state-based preventative action comprising one or a combination of: actuating the sensory alarm; actuating the means for slowing or stopping the machine, or determining an acoustic-based machine object distance using the acoustic location device attached to the machine and operatively connected to the processor; and conditional upon the at least one minimum safe distance exceeding the determined acoustic-based machine-object distance, taking at least one acoustic-based preventative action comprising one or a combination of: actuating a sensory alarm; or actuating a means for slowing or stopping the machine.

* * * * *